(12) United States Patent
Nishikawa et al.

(10) Patent No.: US 12,017,137 B2
(45) Date of Patent: Jun. 25, 2024

(54) DEVICE INCLUDING PLURALITY OF MARKERS

(71) Applicant: Sony Interactive Entertainment Inc., Tokyo (JP)

(72) Inventors: Kenzo Nishikawa, Tokyo (JP); Takanori Minamino, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 37 days.

(21) Appl. No.: 17/440,862

(22) PCT Filed: Mar. 26, 2020

(86) PCT No.: PCT/JP2020/013747
§ 371 (c)(1),
(2) Date: Sep. 20, 2021

(87) PCT Pub. No.: WO2020/213363
PCT Pub. Date: Oct. 22, 2020

(65) Prior Publication Data
US 2022/0161126 A1    May 26, 2022

(30) Foreign Application Priority Data
Apr. 15, 2019    (JP) ................. 2019-077220

(51) Int. Cl.
*A63F 13/213*    (2014.01)
*A63F 13/26*    (2014.01)
(Continued)

(52) U.S. Cl.
CPC ............ *A63F 13/213* (2014.09); *A63F 13/26* (2014.09); *A63F 13/428* (2014.09); *G06F 3/0308* (2013.01); *G06F 3/0346* (2013.01)

(58) Field of Classification Search
CPC ...... A63F 13/213; A63F 13/26; A63F 13/428; G06F 3/0308; G06F 3/0346
See application file for complete search history.

(56) References Cited

U.S. PATENT DOCUMENTS 8,350,805 B2    1/2013    Miyazaki
8,747,224 B2    6/2014    Miyazaki
(Continued)

FOREIGN PATENT DOCUMENTS

EP    2006002 A1    12/2008
JP    5714108 U    1/1982
(Continued)

OTHER PUBLICATIONS

International Search Report for related PCT Application No. PCT/JP2020/013746, 4 pages, dated Jun. 9, 2020.
(Continued)

*Primary Examiner* — Malina D. Blaise
(74) *Attorney, Agent, or Firm* — Matthew B. Dernier, Esq.

(57) ABSTRACT

An input device includes a case body and a plurality of markers configured to emit light to the outside of the case body. A first light source is a dedicated light source for lighting one marker, and a second light source is a shared light source for lighting a plurality of markers. The second light source is connected to a plurality of markers with a light guide pipe so as to supply light to the plurality of markers through the light guide pipe.

5 Claims, 8 Drawing Sheets

(51) Int. Cl.
*A63F 13/428* (2014.01)
*G06F 3/03* (2006.01)
*G06F 3/0346* (2013.01)

(56) References Cited

U.S. PATENT DOCUMENTS

| | | | |
|---|---|---|---|
| 8,947,494 B2 | 2/2015 | Abe | |
| 9,649,558 B2 | 5/2017 | Stafford | |
| 9,746,921 B2* | 8/2017 | Mallinson | G06F 3/016 |
| 9,884,248 B2 | 2/2018 | Koseki | |
| 10,275,097 B2 | 4/2019 | Tanaka | |
| 11,036,053 B2 | 6/2021 | Isayama | |
| 11,569,826 B2* | 1/2023 | Tang | H03M 3/34 |
| 2007/0218994 A1 | 9/2007 | Goto | |
| 2009/0174657 A1 | 7/2009 | Miyazaki | |
| 2011/0183751 A1* | 7/2011 | Ueshima | A63F 13/213 463/40 |
| 2011/0263329 A1* | 10/2011 | Miyazaki | A63F 13/28 463/43 |
| 2013/0106986 A1 | 5/2013 | Abe | |
| 2013/0281213 A1* | 10/2013 | Yasuda | A63F 13/42 463/39 |
| 2015/0170549 A1 | 6/2015 | Kasahara | |
| 2015/0235423 A1* | 8/2015 | Tobita | G06T 7/74 345/633 |
| 2015/0258431 A1* | 9/2015 | Stafford | G06F 3/014 463/31 |
| 2015/0352437 A1* | 12/2015 | Koseki | A63F 13/5255 463/31 |
| 2017/0039441 A1* | 2/2017 | Lim | G16H 70/00 |
| 2018/0074654 A1* | 3/2018 | Tanaka | G06F 3/0425 |
| 2018/0108179 A1* | 4/2018 | Tomlin | G06F 3/0346 |
| 2018/0150971 A1 | 5/2018 | Adachi | |
| 2019/0094993 A1* | 3/2019 | Kim | G06F 3/03545 |
| 2019/0096068 A1* | 3/2019 | Fontanel | G06T 7/20 |
| 2019/0102613 A1 | 4/2019 | Watababe | |
| 2019/0302898 A1* | 10/2019 | Holverson | G06F 3/03543 |
| 2020/0126267 A1* | 4/2020 | Wu | G06T 7/70 |
| 2020/0225490 A1* | 7/2020 | Isayama | G06T 15/00 |

FOREIGN PATENT DOCUMENTS

| | | |
|---|---|---|
| JP | 4133204 U | 12/1992 |
| JP | 348822 | 9/1994 |
| JP | 2005135425 A | 5/2005 |
| JP | 2007296248 A | 11/2007 |
| JP | 2015232783 A | 12/2015 |
| JP | 2017101961 A | 6/2017 |
| JP | 2017516185 A | 6/2017 |
| JP | 2018032102 A | 3/2018 |
| JP | 2019061528 A1 | 4/2019 |
| WO | 2007116578 A1 | 10/2007 |
| WO | 2007129432 A1 | 11/2007 |
| WO | 2009093461 A1 | 7/2009 |
| WO | 2010055737 A1 | 5/2010 |
| WO | 2011145180 A1 | 11/2011 |
| WO | 2015079715 A1 | 6/2015 |
| WO | 2016157807 A1 | 10/2016 |
| WO | 2019021601 A1 | 1/2019 |

OTHER PUBLICATIONS

International Search Report for related PCT Application No. PCT/JP2020/016854, 4 pages, dated Jul. 7, 2020.
International Search Report for corresponding PCT Application No. PCT/JP2020/013747, 4 pages, dated Jun. 16, 2020.
Extended European Search Report for related EP Application No. 20787365.4, 10 pages, dated Dec. 6, 2022.
Decision to Grant a Patent for related JP Application No. 2019-075855, 5 pages, dated Apr. 28, 2023.
Notice of Reasons for Refusal for corresponding JP Application No. 2019-077220, 6 pages, dated Apr. 12, 2023.

* cited by examiner

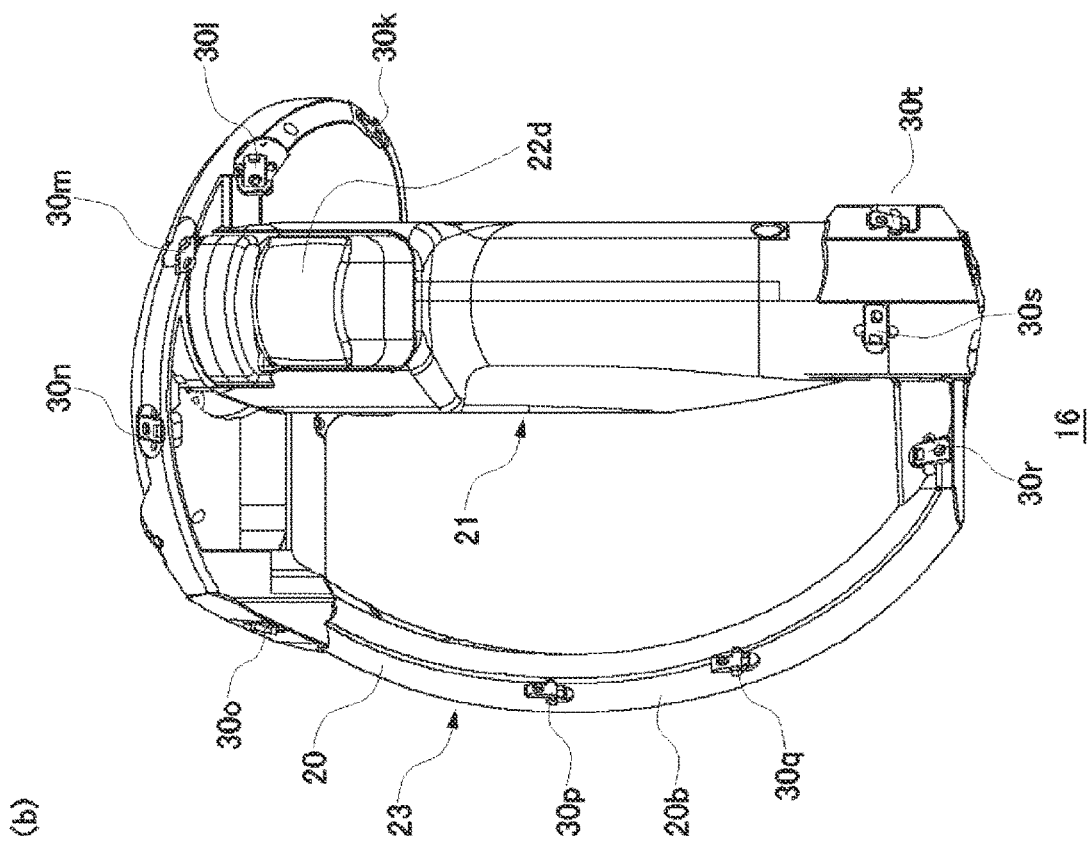
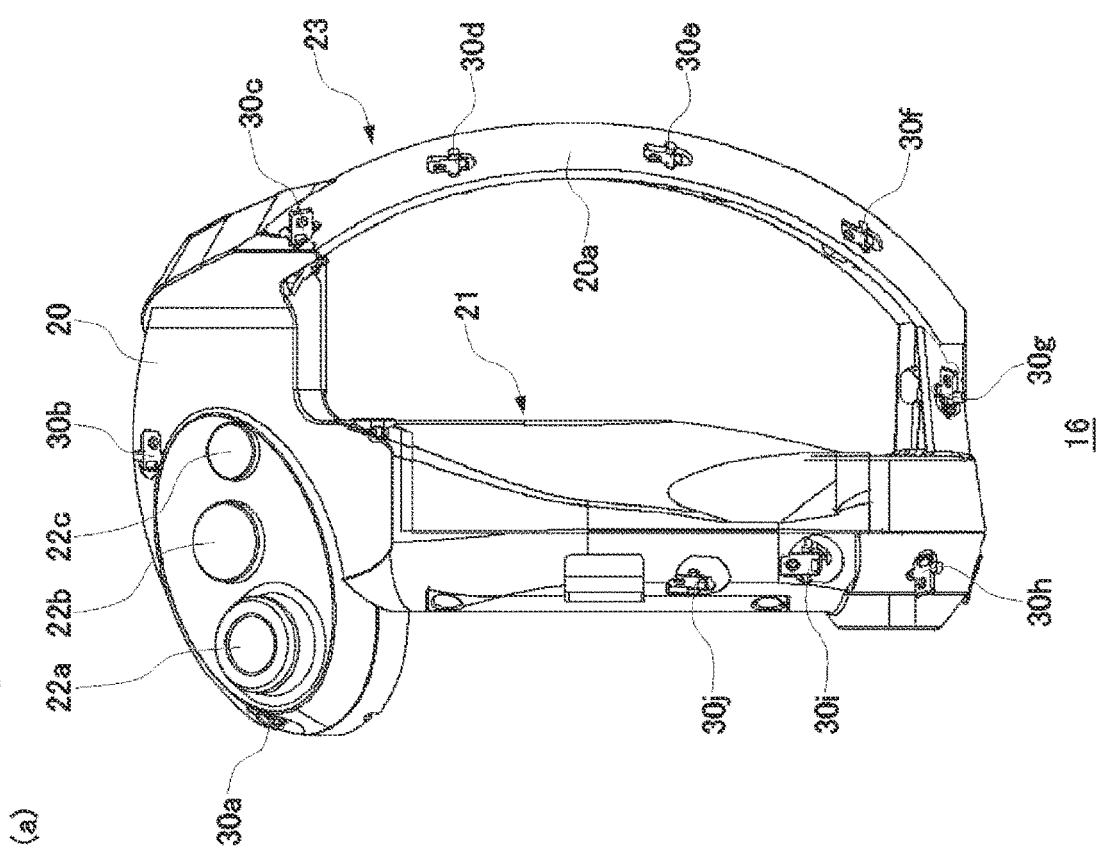

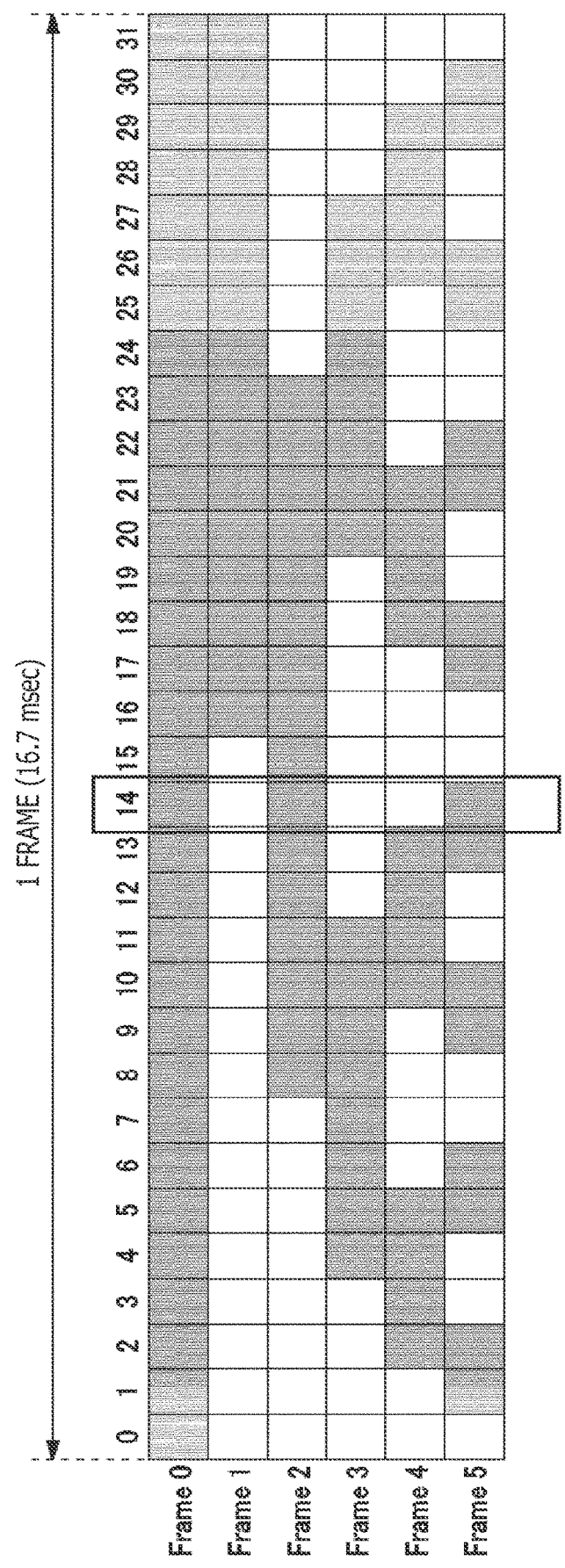

14

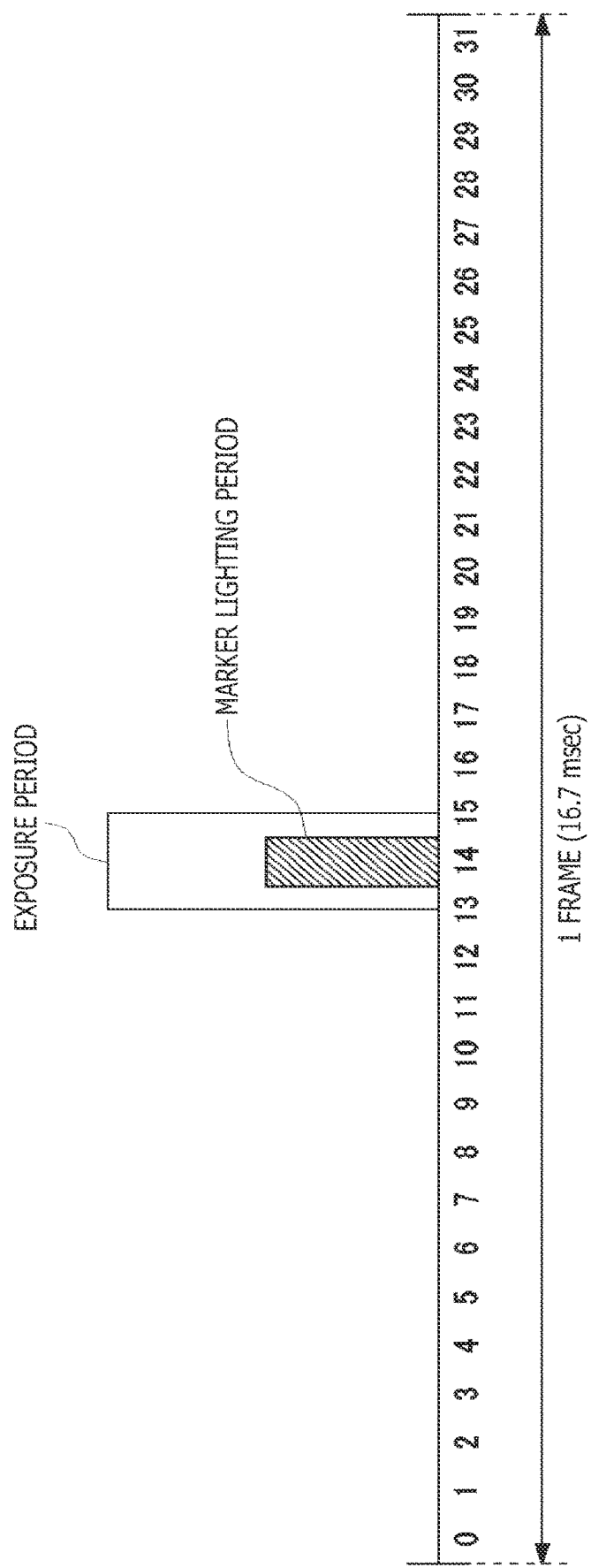

DEVICE INCLUDING PLURALITY OF MARKERS

TECHNICAL FIELD

The present invention relates to a device including a plurality of markers.

BACKGROUND ART

PTL 1 discloses a game device that acquires a frame image obtained by imaging a space in front of the game device, that estimates, from the position of a light emitting diode (LED) image of a game controller in the frame image, position information and posture information regarding the game controller in a real space, and that reflects the estimated position information and/or posture information on the processing of a game application.

CITATION LIST

Patent Literature

[PTL 1] Japanese Patent Laid-open No. 2007-296248

SUMMARY

Technical Problem

A head-mounted display (HMD) is fitted to the head of a user to provide the user with a virtual reality (VR) video space. The user who wears the HMD operates operation buttons in an input device and can thereby produce various inputs to the video space.

In recent years, techniques for tracking the position and posture of a device to reflect information obtained, on a three-dimensional (3D) model in a VR space, have widely been used. The movement of a player character or a game object in a game space is synchronized with changes in the position and posture of a device to be tracked, and thus an intuitive operation by a user is realized. A plurality of markers that are lit are used for the tracking of the device, an image obtained by imaging the plurality of markers is analyzed, and the positions of marker images within the image are thus identified, with the result that the position and posture of the device in a real space are estimated.

In order to estimate the position and posture of the device with a high degree of accuracy, it is necessary to accurately identify the positions of the marker images within the image obtained by imaging the device. As the number of marker images that are imaged is increased, the accuracy of estimation of the position and posture of the device is enhanced. However, since the markers are lit with light sources such as light emitting elements, when the number of light sources is increased, the manufacturing cost thereof is disadvantageously increased.

Hence, an object of the present invention is to make the number of light sources smaller than the number of markers in a device including a plurality of markers. Note that, while the device may be an input device that includes operation buttons, the device may be a device that is simply a target to be tracked without including operation members.

Solution to Problem

In order to solve the problem described above, a device according to an aspect of the present invention includes a case body and a plurality of markers configured to emit light to the outside of the case body. The device includes a first light source for lighting one marker and a second light source for lighting a plurality of markers.

A device according to another aspect of the present invention includes a case body and a plurality of markers configured to emit light to the outside of the case body. Light emission of a predetermined marker of the plurality of markers is performed to identify timing of imaging by an image sensing device.

BRIEF DESCRIPTION OF DRAWINGS

FIG. 4 depicts diagrams illustrating the external shape of an input device.

FIG. 5 is a diagram illustrating an example of a light emission pattern for synchronous processing that is used to identify timing of imaging.

FIG. 8 is a diagram illustrating a period during which a marker is lit that is set within the exposure period of the image sensing devices.

DESCRIPTION OF EMBODIMENT

Figure 1:
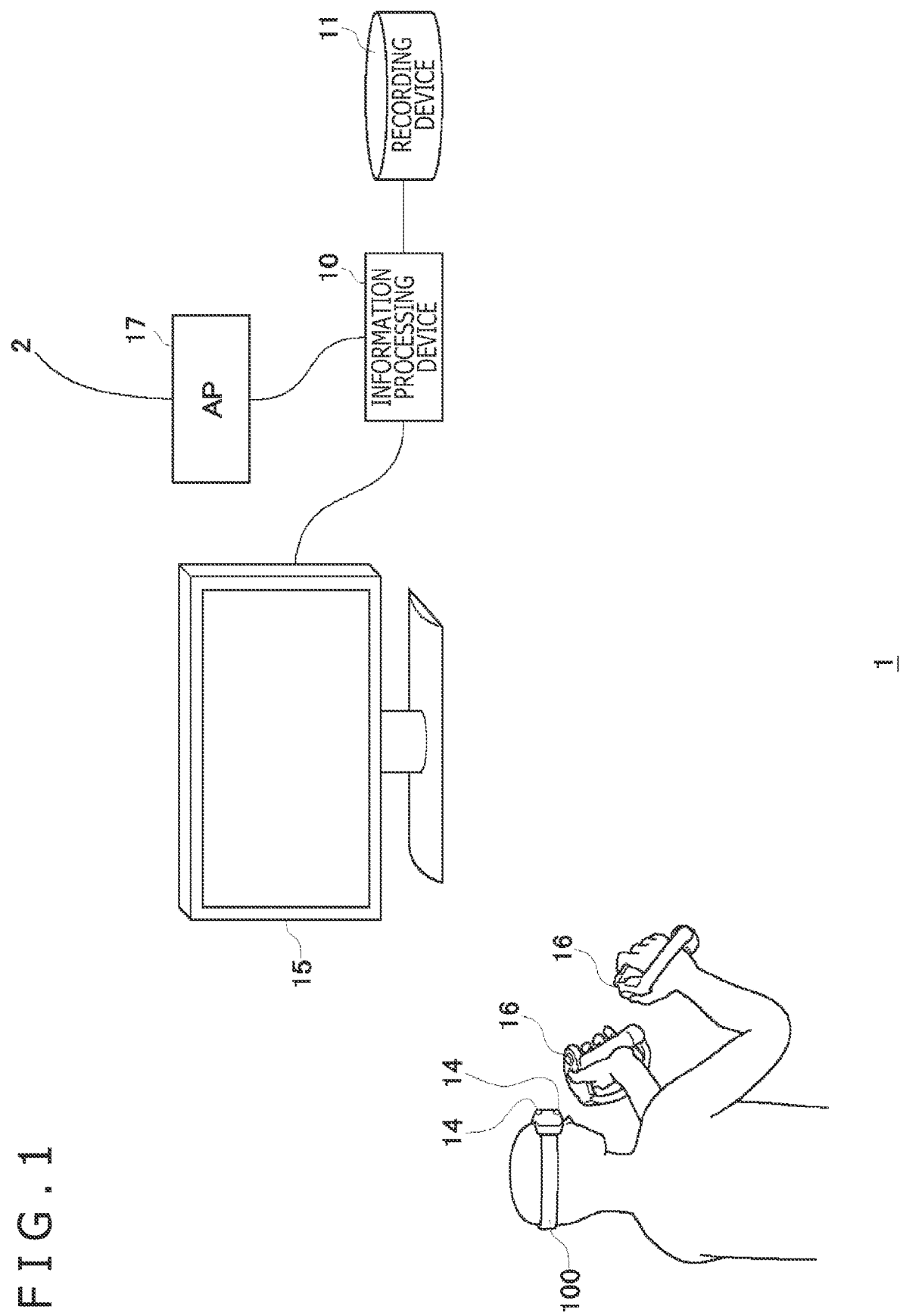
FIG. 1 is a diagram depicting an example of the configuration of an information processing system in an embodiment.

FIG. 1 depicts an example of the configuration of an information processing system 1 in an embodiment. The information processing system 1 includes an information processing device 10, a recording device 11, an HMD 100, an input device 16 that is operated with fingers of a user, and an output device 15 that outputs images and sounds. The output device 15 may be a television set. The information processing device 10 is connected through an access point (AP) 17 to an external network 2 such as the Internet. The AP 17 has the functions of a wireless access point and a router, and the information processing device 10 may be connected to the AP 17 with a cable or may be connected thereto with a known wireless communication protocol.

The recording device 11 records system software and applications such as game software. The information processing device 10 may download the game software to the recording device 11 from a content server through the network 2. The information processing device 10 executes the game software and supplies image data and sound data of the game to the HMD 100. The information processing device 10 and the HMD 100 may be connected to each other with a known wireless communication protocol or may be connected to each other with a cable.

The HMD 100 is a display device that is fitted to the head by the user, to display images on display panels located in front of the eyes. The HMD 100 individually displays an image for the left eye on a display panel for the left eye and an image for the right eye on a display panel for the right eye. These images form parallax images seen from left and right eyepoints to realize a stereoscopic view. In order for the user to look at the display panels through optical lenses, the information processing device 10 supplies, to the HMD 100, parallax image data obtained by correcting optical distortion caused by the lenses.

Although the output device 15 is not needed for the user who wears the HMD 100, preparing the output device 15 enables another user to see the display image of the output device 15. While the information processing device 10 may display, on the output device 15, the same image as the image seen by the user who is wearing the HMD 100, another image may be displayed. For example, when the user who is wearing the HMD 100 plays a game together with another user, a game image from the eyepoint of a character of the other user may be displayed from the output device 15.

The information processing device 10 and the input device 16 may be connected to each other with a known wireless communication protocol or may be connected to each other with a cable. The input device 16 includes a plurality of operation members such as operation buttons, and the user operates the operation members with the fingers while grasping the input device 16. When the information processing device 10 executes a game, the input device 16 is used as a game controller. The input device 16 is provided with a posture sensor including a three-axis acceleration sensor and a three-axis gyro sensor, and transmits sensor data to the information processing device 10 at a predetermined cycle (for example, 1600 Hz).

The game of the embodiment handles not only the operation information of the operation members in the input device 16 but also the operation information of the position, the posture, the movement, and the like of the input device 16, and reflects the operation information on the movement of the player character within a virtual three-dimensional space. For example, the operation information of the operation members may be used as information for moving the player character, and the operation information of the position, the posture, the movement and the like of the input device 16 may be used as information for moving an arm of the player character. In a battle scene within the game, the movement of the input device 16 is reflected on the movement of the player character holding a weapon, and thus an intuitive operation by the user is realized, with the result that the immersion of the user in the game is enhanced.

In order to track the position and posture of the input device 16, a plurality of markers (light emitting portions) that can be imaged with image sensing devices 14 mounted on the HMD 100 are provided on the input device 16. The information processing device 10 analyzes an image obtained by imaging the input device 16, to estimate the position information and posture information of the input device 16 in a real space, and provides the estimated position information and posture information to the game.

On the HMD 100, a plurality of image sensing devices 14 are mounted. The plurality of image sensing devices 14 are attached to different positions of the front surface of the HMD 100 with different postures such that the overall imaging range obtained by adding up the imaging ranges of the image sensing devices 14 includes the entire field of view of the user. The image sensing device 14 is preferably an image sensor that can acquire the images of the plurality of markers in the input device 16. For example, when the marker emits visible light, the image sensing device 14 includes a visible light sensor, such as a charge coupled device (CCD) sensor or a complementary metal oxide semiconductor (CMOS) sensor, that is used in a general digital video camera. When the marker emits invisible light, the image sensing device 14 includes an invisible light sensor. The plurality of image sensing devices 14 image a space in front of the user at a synchronized timing and predetermined intervals (for example, 60 frames/second), and transmit image data obtained by imaging the input device 16 to the information processing device 10.

The information processing device 10 identifies the positions of a plurality of marker images of the input device 16 included in a captured image. Note that, while the one input device 16 may be imaged with a plurality of image sensing devices 14 at the same timing, since the attachment positions and attachment postures of the image sensing devices 14 are known, the information processing device 10 combines a plurality of captured images to identify the positions of the marker images.

The three-dimensional shape of the input device 16 and the position coordinates of the plurality of markers arranged on the surface thereof are known, and thus, the information processing device 10 estimates the position coordinates and the posture of the input device 16, based on the distribution of the marker images within the captured image. The position coordinates of the input device 16 may be position coordinates in a three-dimensional space with a reference position being an origin, and the reference position may be position coordinates (longitude and latitude) set before the start of the game.

Note that the information processing device 10 can also estimate the position coordinates and the posture of the input device 16 by using the sensor data detected with the posture sensor in the input device 16. Hence, the information processing device 10 of the embodiment uses the result of the estimation based on the captured image obtained with the image sensing devices 14 and the result of the estimation based on the sensor data, so as to perform tracking processing on the input device 16 with a high degree of accuracy.

Figure 2:
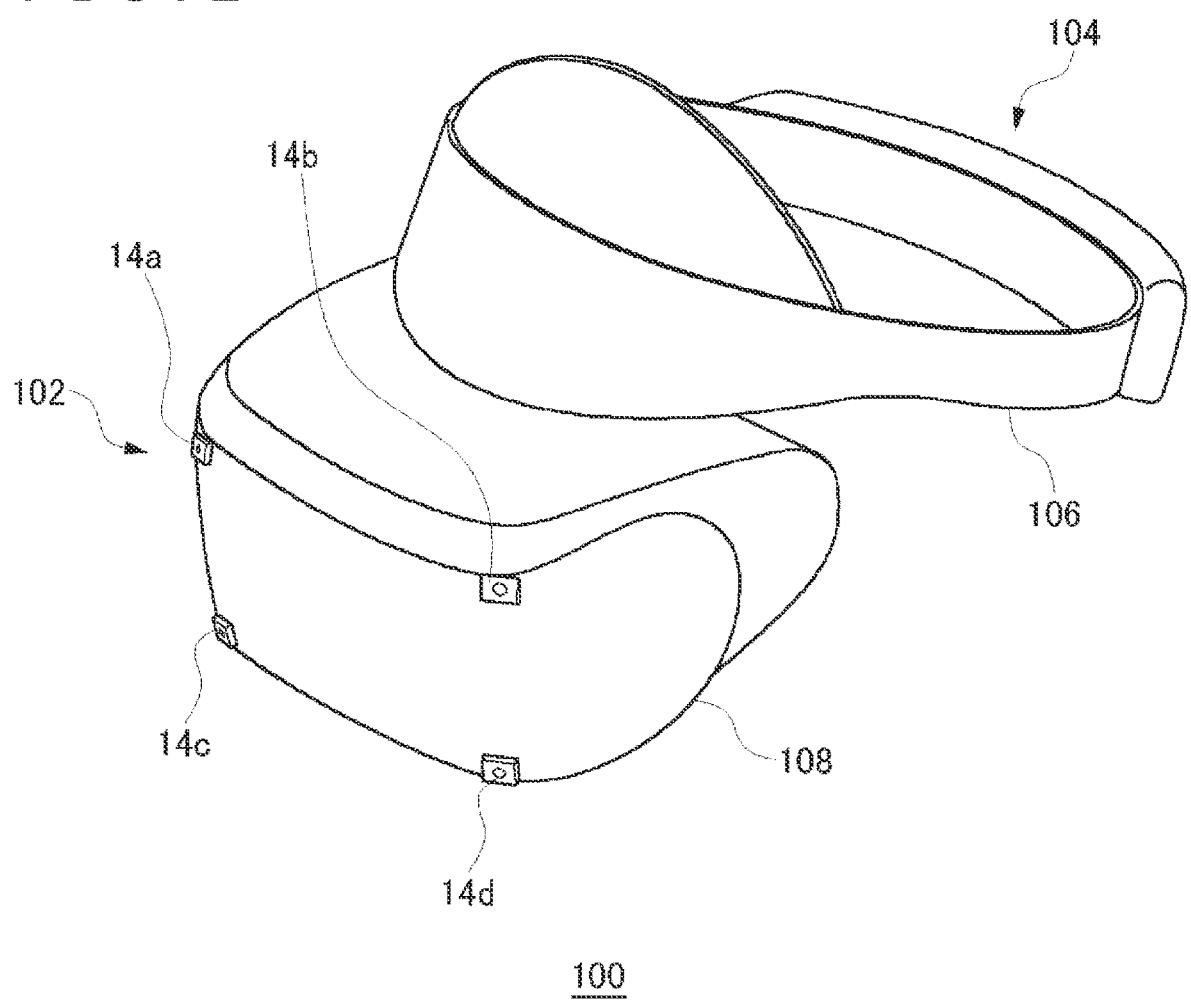
FIG. 2 is a diagram depicting an example of the external shape of an HMD.

FIG. 2 depicts an example of the external shape of the HMD 100. The HMD 100 includes an output mechanism portion 102 and a fitting mechanism portion 104. The fitting mechanism portion 104 includes a fitting band 106 that is put on by the user to be worn around the head so as to fix the HMD 100 to the head. The fitting band 106 has a material or a structure in which the length thereof can be adjusted according to the head circumference of the user.

The output mechanism portion 102 includes a housing 108 having a shape that covers the left and right eyes in a state where the user is wearing the HMD 100, and also includes, therewithin, the display panels directly opposite the eyes when the HMD 100 is worn. The display panel may be a liquid crystal panel, an organic electroluminescence (EL) panel, or the like. Within the housing 108, a pair of left and right optical lenses that are located between the display panels and the eyes of the user to enlarge the viewing angle of the user are further included. The HMD 100 may further include speakers and earphones in positions corresponding to the ears of the user or may be configured such that external headphones are connected thereto.

A plurality of image sensing devices 14a, 14b, 14c, and 14d are provided on an outer surface on the forward side of the housing 108. With reference to the direction of the line of sight of the user, the image sensing device 14a is attached to an upper right corner of the outer surface on the forward side such that a camera optical axis is directed diagonally upward to the right, the image sensing device 14b is attached to an upper left corner of the outer surface on the forward side such that the camera optical axis is directed diagonally upward to the left, the image sensing device 14c is attached to a lower right corner of the outer surface on the forward side such that the camera optical axis is directed diagonally downward to the right, and the image sensing device 14d is attached to a lower left corner of the outer surface on the forward side such that the camera optical axis is directed diagonally downward to the left. A plurality of image sensing devices 14 are installed in this way, and thus, the overall imaging range obtained by adding up the imaging ranges of the image sensing devices 14 includes the entire field of view of the user. The field of view of the user described above may be the field of view of the user in a virtual three-dimensional space.

The HMD 100 transmits, to the information processing device 10, the sensor data detected with the posture sensor and the image data obtained by imaging by the image sensing devices 14, and receives game image data and game sound data generated in the information processing device 10.

Figure 3:
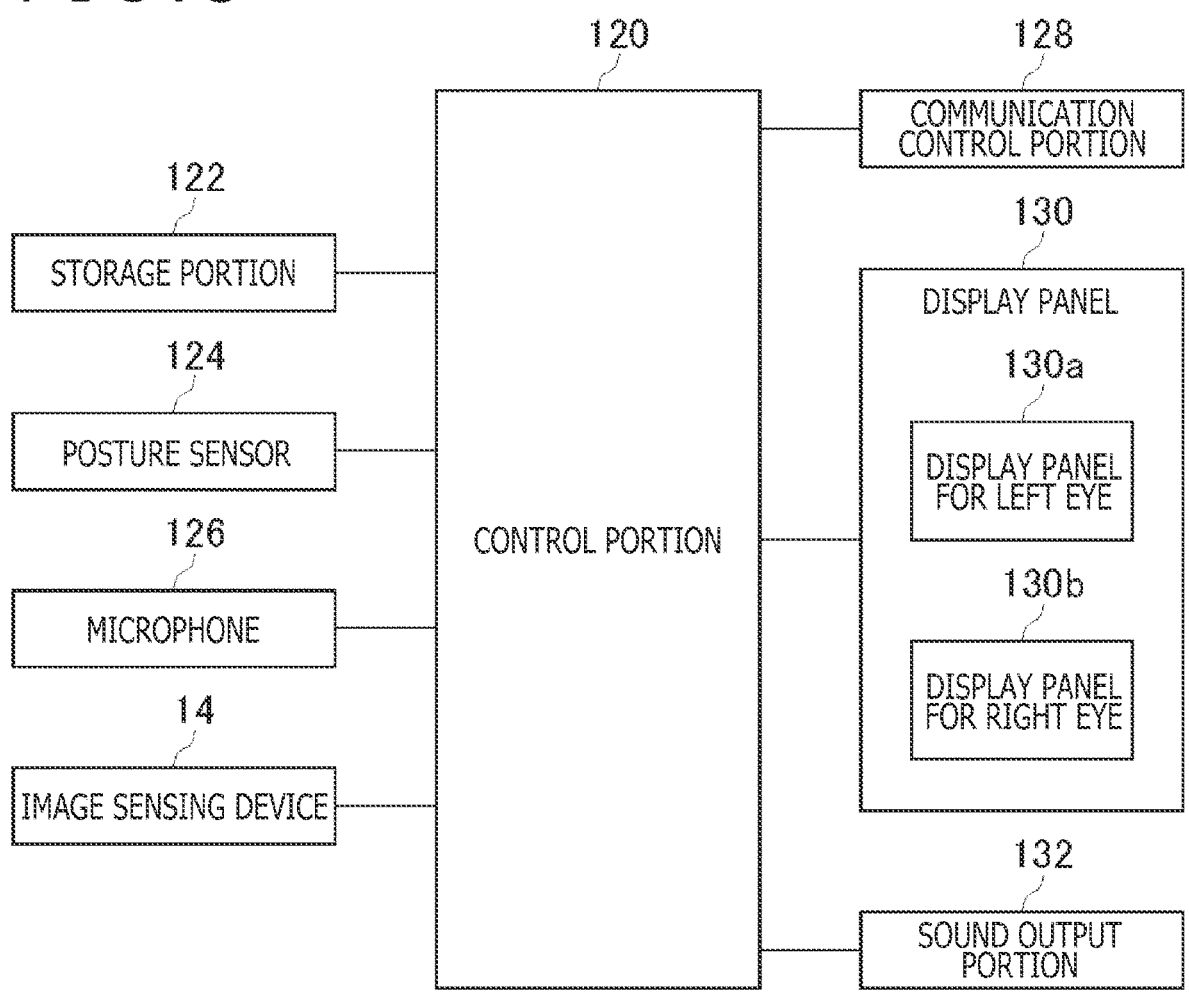
FIG. 3 is a diagram depicting a functional block of the HMD.

FIG. 3 depicts a functional block of the HMD 100. A control portion 120 is a main processor that processes and outputs various types of data such as the image data, the sound data, and the sensor data and commands. A storage portion 122 temporarily stores the data, the commands, and the like processed by the control portion 120. The posture sensor 124 acquires the sensor data regarding the movement of the HMD 100. The posture sensor 124 includes at least a three-axis acceleration sensor and a three-axis gyro sensor.

A communication control portion 128 transmits data output from the control portion 120, to the external information processing device 10 through a network adapter or an antenna by wired or wireless communication. In addition, the communication control portion 128 receives data from the information processing device 10, and outputs it to the control portion 120.

When the control portion 120 receives the game image data or the game sound data from the information processing device 10, the control portion 120 supplies the game image data to the display panel 130 and makes the display panel 130 display the image or supplies the game sound data to a sound output portion 132 and makes the sound output portion 132 output the sound. The display panel 130 includes the display panel for the left eye 130a and the display panel for the right eye 130b, and a pair of parallax images are displayed on the display panels. Further, the control portion 120 causes the sensor data from the posture sensor 124, the sound data from a microphone 126, and captured image data from the image sensing devices 14 to be transmitted from the communication control portion 128 to the information processing device 10.

FIG. 4 depicts the external shape of the input device 16. FIG. 4(a) depicts the front shape of the input device 16, and FIG. 4(b) depicts the back shape of the input device 16. The input device 16 includes a case body 20, a plurality of operation members 22a, 22b, 22c, and 22d (hereinafter referred to as the "operation members 22" when they are not particularly distinguished) operated by the user, and a plurality of markers 30a to 30t (hereinafter referred to as the "marker 30" or "markers 30" when they are not particularly distinguished) for emitting light to the outside of the case body 20. The operation members 22 are arranged on the head of the case body 20, and include an analog stick for performing a tilt operation, a press button, a trigger button for inputting a pulled amount, and the like.

The case body 20 includes a grasping portion 21 and a curved portion 23 that couples a case body head portion and a case body bottom portion, and the user passes fingers ranging from the index finger to the little finger between the grasping portion 21 and the curved portion 23 so as to grasp the grasping portion 21. In a state where the user grasps the grasping portion 21, the user operates the operation members 22a, 22b, and 22c with the thumb and operates the operation member 22d with the index finger. Although the markers 30h, 30i, and 30j are provided on the grasping portion 21, they are arranged in such positions that they are not hidden by the hand even in a state where the user grasps the grasping portion 21. At least one or more markers 30 are provided on the grasping portion 21, thus enhancing the accuracy of tracking.

The marker 30 is a light emitting portion that emits light to the outside of the case body 20, and includes a resin portion that diffusely emits light from a light source such as an LED element to the outside on the surface of the case body 20. The marker 30 is imaged with the image sensing devices 14 so as to be used for estimation processing of position information and posture information regarding the input device 16. Preferably, since the image sensing devices 14 image the input device 16 at predetermined intervals (for example, 60 frames/second), the marker 30 emits light in synchronization with periodical imaging timing of the image sensing devices 14 and is unlit in the non-exposure period of the image sensing devices 14 so as to reduce unnecessary power consumption. The image sensing devices 14 and the input device 16 are operated based on respective clocks, and in the embodiment, synchronous processing on the exposure period of the image sensing devices 14 and a period during which the marker 30 is lit is performed as follows.

FIG. 5 depicts an example of a light emission pattern for the synchronous processing that is used to identify timing of imaging by the image sensing devices 14. A length in a horizontal direction represents an imaging interval (16.7 msec) corresponding to one frame, and lighting control on the marker 30 is performed in units of time grids obtained by dividing the imaging interval. In this example, the imaging interval is divided into 32 parts, and one time grid is 521 μsec. In FIG. 5, the time grid that is colored indicates a lighting period at a first brightness, and the time grid that is not colored indicates a lighting period at a second brightness. Note that, the first brightness is different from the second brightness, and the first brightness may be higher than the second brightness. In a case where the marker 30 is imaged when light is emitted at the first brightness, a high-brightness marker image is included in the captured image, whereas, in a case where the marker 30 is imaged when light is emitted at the second brightness, a low-brightness marker image is included in the captured image. The light emission pattern is determined such that when the marker 30 is continuously imaged at the imaging intervals corresponding to one frame so as to obtain six captured images, the order in which light is emitted at the first brightness and light is emitted at the second brightness differs depending on the time grid.

In the synchronous processing, one or more markers 30 imaged with the image sensing devices 14 are subjected to lighting control using the light emission pattern illustrated in FIG. 5. It is assumed that the marker 30 is imaged under such lighting control that, after the start of the synchronous processing, the marker 30 is lit at the "first brightness" for the first captured image (Frame 0), the marker 30 is lit at the "second brightness" for the second captured image (Frame 1), the marker 30 is lit at the "first brightness" for the third captured image (Frame 2), the marker 30 is lit at the "second brightness" for the fourth captured image (Frame 3), the marker 30 is lit at the "second brightness" for the fifth captured image (Frame 4), and the marker 30 is lit at the "first brightness" for the sixth captured image (Frame 5). A time grid corresponding to a combination of the first brightness and the second brightness in the six continuous captured images is the time grid of grid number 14. Hence, thereafter, the input device 16 periodically lights the marker 30 with timing of grid number 14, and can thereby perform such control that the period during which the marker 30 is lit is synchronized with the exposure period of the image sensing devices 14 to prevent the marker 30 from being lit in the non-exposure period of the image sensing devices 14.

Figure 6:
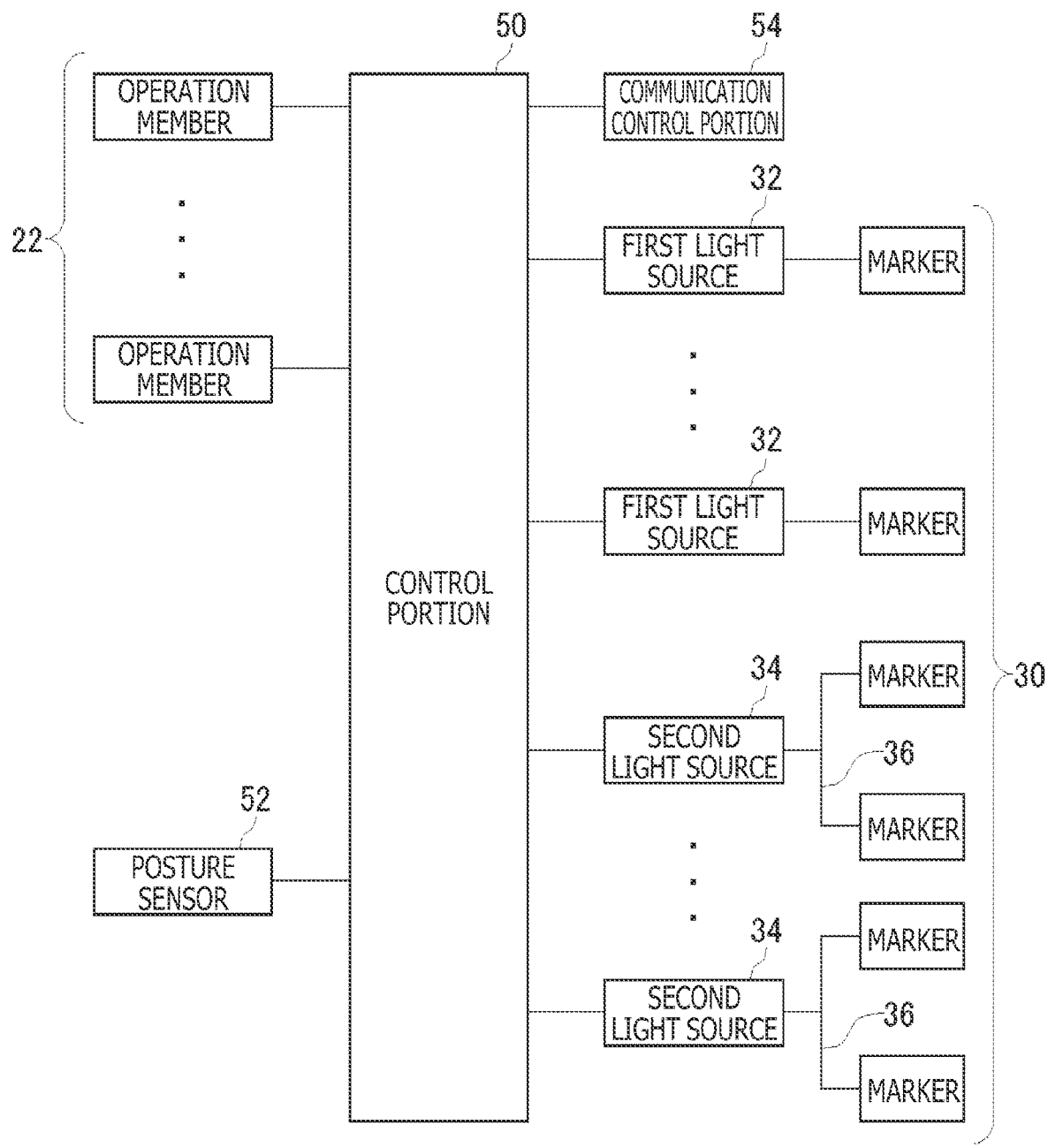
FIG. 6 is a diagram illustrating a functional block of the input device.

FIG. 6 depicts a functional block of the input device 16. A control portion 50 receives operation information that is input to the operation members 22, and also receives sensor data acquired with a posture sensor 52. The posture sensor 52 acquires the sensor data regarding the movement of the input device 16, and includes at least a three-axis acceleration sensor and a three-axis gyro sensor. The control portion 50 supplies, to a communication control portion 54, the operation information and the sensor data that are received. The communication control portion 54 transmits the operation information and the sensor data output from the control portion 50, to the information processing device 10 through a network adapter or an antenna by wired or wireless communication. Further, the communication control portion 54 acquires the light emission pattern for the synchronous processing and/or an instruction to emit light, from the information processing device 10.

The input device 16 includes first light sources 32 each of which lights one marker 30 and second light sources 34 each of which lights a plurality of markers 30. Each of the first light source 32 and the second light source 34 may be an LED element.

The first light source 32 is a dedicated light source for lighting only one marker 30, and independently lights one marker 30. The marker 30 includes the resin portion that diffusely emits light to the outside on the surface of the case body 20, and the resin portion of the marker 30 lit by the first light source 32 may be a resin for sealing an LED element. Here, the marker 30 and the first light source 32 may have a form of one LED device.

On the other hand, the second light source 34 is a shared light source for lighting two or more markers 30, and simultaneously lights two or more markers 30. One second light source 34 is configured to be able to light a plurality of markers 30, and thus, the number of light sources in the input device 16 can be made smaller than the number of markers 30, contributing to a reduction in the manufacturing cost.

The second light source 34 is connected to a plurality of markers 30 with a light guide pipe 36. The light guide pipe 36 branches light output from the second light source 34 to a plurality of pipelines so as to transmit the light to the resin portions of the plurality of markers 30. In this way, one second light source 34 can light a plurality of markers 30, and thus, the number of light sources can be made smaller than the number of markers 30.

Figure 7:
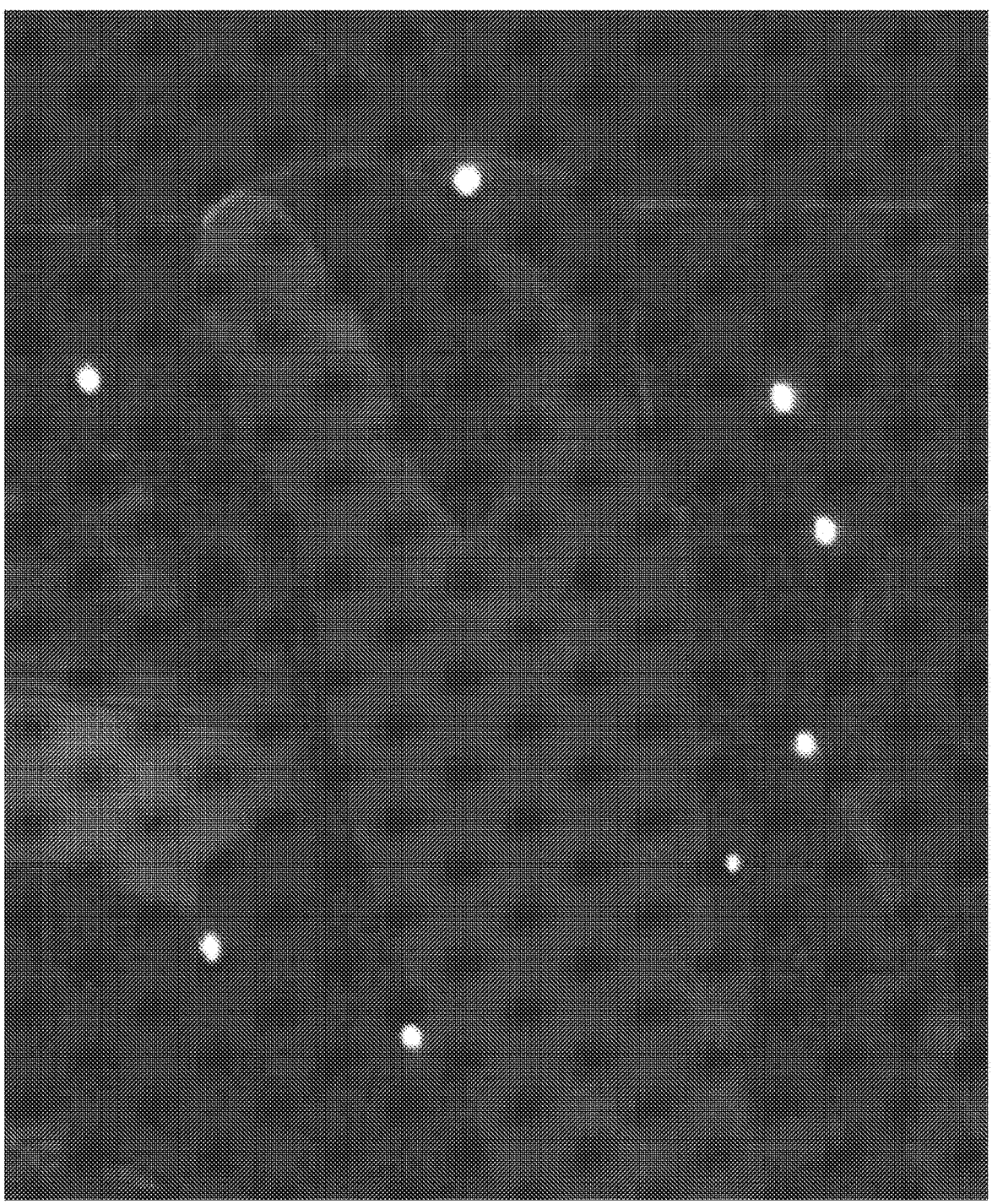
FIG. 7 is a diagram depicting an example of part of an image obtained by imaging the input device.

FIG. 7 depicts an example of part of an image obtained by imaging the input device 16. As illustrated in the figure, the captured image includes the images of the markers 30 that emit light. In the HMD 100, the communication control portion 128 transmits the image data obtained by imaging by the image sensing devices 14 to the information processing device 10, and the information processing device 10 extracts the images of the markers 30 from the image data. In the synchronous processing, the information processing device 10 can distinguish the case where the marker 30 emits light at the first brightness and the case where the marker 30 emits light at the second brightness.

While the synchronous processing on the exposure period of the image sensing devices 14 and the period during which the marker 30 is lit is performed before the start of the game, the synchronous processing may be performed while the game is being played. Since the image sensing devices 14 cannot image the image of the marker 30 when synchronization is lost, it is necessary to immediately perform the synchronous processing in a case where the synchronization is lost.

In the synchronous processing, the control portion 50 makes one or more first light sources 32 capable of independently lighting the marker 30 emit light with the light emission pattern for the synchronous processing (see FIG. 5) provided from the information processing device 10. Note that, while all the light sources may be made to emit light with the light emission pattern for the synchronous processing, it is possible that, when the light sources are made to emit light at the second brightness that is lower than the first brightness, the accuracy of estimation processing of the position and posture thereof is lowered depending on the environment. Hence, the number of light sources to be used for the synchronous processing is preferably minimized, and the control portion 50 may dynamically select, for example, the first light sources 32 of two markers 30 directed in the direction of the image sensing devices 14 so as to make them emit light with the light emission pattern for the synchronous processing. Note that, since the second light source 34 lights a plurality of markers 30 at the same brightness, it is undesirable that the control portion 50 uses the second light source 34 when dynamically selecting two markers 30 to light them. Hence, in the embodiment, the control portion 50 makes the first light source 32 emit light with the light emission pattern for the synchronous processing.

As depicted in FIG. 5, in the light emission pattern, the period during which the marker 30 is lit at the first brightness and the period during which the marker 30 is lit at the second brightness are determined in a plurality of frame periods. The information processing device 10 identifies a pattern of changes in the brightness value of the marker 30 included in a plurality of continuous captured images, so as to identify a time grid number included in the exposure period of the image sensing devices 14. For example, the exposure period may be set to a length approximately twice the time grid.

FIG. 8 depicts the period during which the marker 30 is lit that is set within the exposure period of the image sensing devices 14. When the information processing device 10 identifies the time grid number, the information processing device 10 generates an instruction to emit light at the timing of the time grid number and transmits it to the input device 16. In the input device 16, based on the instruction to emit light, the control portion 50 periodically makes all the markers 30 emit light in the time position of grid number 14. After the establishment of the synchronization, the control portion 50 turns on the light source for only a length of one time grid (521 microseconds) in one frame period, and turns off the light source in a period other than the one time grid, with the result that it is possible to reduce wasted power consumption.

When, in the HMD 100, the communication control portion 128 transmits the image data obtained by imaging by the image sensing devices 14 to the information processing device 10, the information processing device 10 extracts the images of the markers 30 from the image data. Since the three-dimensional shape of the input device 16 and the position coordinates of the markers 30 arranged on the surface thereof are known, the information processing device 10 solves a Perspective n-Point (PnP) problem from the distribution of the images of the markers 30 within the captured image so as to estimate the position and posture of the input device 16 with respect to the image sensing devices 14.

The present invention has been described above based on the embodiment. The embodiment described above is illustrative, and a person skilled in the art would understand that various variations of the constituent elements thereof and the combination of processing processes are possible and that the variations are also within the scope of the present invention.

Although, in the embodiment, the arrangement of a plurality of markers 30 in the input device 16 including the operation members 22 is described, the device to be tracked does not necessarily need to include the operation members 22. In addition, although, in the embodiment, the image sensing devices 14 are attached to the HMD 100, the image sensing devices 14 may be attached to positions other than the HMD 100 as long as the image sensing devices 14 can image marker images.

INDUSTRIAL APPLICABILITY

The present invention can be used for a device including a plurality of markers.

REFERENCE SIGNS LIST

1: Information processing system
10: Information processing device
14: Image sensing device
16: Input device
20: Case body
32: First light source
34: Second light source
36: Light guide pipe
50: Control portion

The invention claimed is:

1. A device comprising:
a case body;
a plurality of markers configured to emit light to an outside of the case body;
a first plurality of light sources, each light source among the first plurality of light sources for lighting a respective one of the plurality of markers;
a second plurality of light sources, each light source among the second plurality of light sources for lighting at least two of the plurality of markers simultaneously; and
a control portion configured to make one or more of the first plurality of light sources emit light with one or more predetermined light emission patterns, wherein:
each of the one or more predetermined light emission patterns is produced by causing the one or more of the first plurality of light sources, or the one or more of the second plurality of light sources, to emit light at a first brightness and at a second brightness at respective lighting periods,
the respective lighting periods occur at respective timing intervals within each of a plurality of imaging frames taken of the device.

2. The device according to claim 1, wherein at least one light source among the second plurality of light sources is connected to the at least two of the plurality of markers with a light guide pipe.

3. The device according to claim 1, wherein light emission of the one or more of the first plurality of light sources with the predetermined light emission pattern is performed to identify timing of imaging by an image sensing device.

4. The device according to claim 1, wherein the device is an input device including an operation member operated by a user.

5. The device according to claim 1, wherein the device is imaged with an image sensing device attached to a head-mounted display.

* * * * *